(12) United States Patent
Qiu et al.

(10) Patent No.: US 10,978,899 B2
(45) Date of Patent: Apr. 13, 2021

(54) WIRELESS CHARGING SYSTEM WITH DUTY CYCLE CONTROL

(71) Applicant: Apple Inc., Cupertino, CA (US)

(72) Inventors: Weihong Qiu, San Ramon, CA (US); Rohan Dayal, Daly City, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 15/884,199

(22) Filed: Jan. 30, 2018

(65) Prior Publication Data

US 2018/0219405 A1 Aug. 2, 2018

Related U.S. Application Data

(60) Provisional application No. 62/453,861, filed on Feb. 2, 2017.

(51) Int. Cl.
*H02J 7/02* (2016.01)
*H02J 50/12* (2016.01)
(Continued)

(52) U.S. Cl.
CPC .............. *H02J 7/025* (2013.01); *H02J 50/12* (2016.02); *H04B 5/0037* (2013.01); *H02J 50/40* (2016.02); *H04B 5/0075* (2013.01)

(58) Field of Classification Search
CPC .......... H02J 7/025; H02J 50/12; H04B 5/0037
(Continued)

(56) References Cited

U.S. PATENT DOCUMENTS 5,157,319 A 10/1992 Klontz et al.
5,710,503 A 1/1998 Sideris et al.
(Continued)

FOREIGN PATENT DOCUMENTS

CA 2489701 A1 6/2006
CN 1653670 A 8/2005
(Continued)

OTHER PUBLICATIONS

"Benefits of Optical Communications," NASA, published May 6, 2014, accessed online Feb. 24, 2017, https://www.nasa.gov/directorates/heo/scan/engineering/technology/txt_opticalcomm_benefits.html, 3 pages.
Zhusheng et al., "Design and Application of Wireless Charging Technology for Electric Vehicle," Electric Age, May 31, 2012, vol. 5, pp. 26-28 (10 pages with translation).
(Continued)

*Primary Examiner* — Richard V Muralidar
(74) *Attorney, Agent, or Firm* — Treyz Law Group, P.C.; Tianyi He (57) ABSTRACT

A wireless power transmitting device transmits wireless power signals to a wireless power receiving device by supplying drive signals with a duty cycle to a wireless power transmitting coil. The wireless power receiving device has a rectifier and a wireless power receiving coil that receives wireless power signals having the duty cycle from the wireless power transmitting device. The rectifier is coupled to an integrated circuit such as a battery charger integrated circuit. The amount of current drawn by the integrated circuit from the rectifier is adjustable. During operation, control circuitry in the wireless power receiving device sets the current to multiple different values while using sensor circuitry to measure output power from the rectifier. A satisfactory value for the duty cycle can be identified by adjusting the duty cycle while observing when peaks in the output power arise as a function of the different current values.

22 Claims, 9 Drawing Sheets

(51) Int. Cl.
*H04B 5/00* (2006.01)
*H02J 50/40* (2016.01)

(58) Field of Classification Search
USPC .......................................... 320/108; 307/107
See application file for complete search history.

(56) References Cited

U.S. PATENT DOCUMENTS

| | | | |
|---|---|---|---|
| 5,742,148 | A | 4/1998 | Sudo et al. |
| 5,764,572 | A | 6/1998 | Hammick |
| 6,567,522 | B1 | 5/2003 | Blackburn |
| 6,825,620 | B2 | 11/2004 | Kuennen et al. |
| 6,844,702 | B2 | 1/2005 | Giannopoulos et al. |
| 6,885,529 | B2 | 4/2005 | Ker et al. |
| 7,047,051 | B2 | 5/2006 | Sackett et al. |
| 7,072,697 | B2 | 7/2006 | Lappetelainen |
| 7,271,727 | B2 | 9/2007 | Steeves |
| 7,522,878 | B2 | 4/2009 | Baarman |
| 7,546,477 | B2 | 6/2009 | Breen |
| 7,560,902 | B2 | 7/2009 | Unger |
| 7,605,496 | B2 | 10/2009 | Stevens et al. |
| 7,613,484 | B2 | 11/2009 | Lappetelainen et al. |
| 7,668,044 | B2 | 2/2010 | Brinkman |
| 7,760,101 | B2 | 7/2010 | Ales, III et al. |
| 7,948,208 | B2 | 5/2011 | Partovi et al. |
| 7,952,322 | B2 | 5/2011 | Partovi et al. |
| 8,004,235 | B2 | 8/2011 | Baarman et al. |
| 8,094,475 | B2 | 1/2012 | Friebe et al. |
| 8,115,420 | B2 | 2/2012 | Morooka et al. |
| 8,129,864 | B2 | 3/2012 | Baarman et al. |
| 8,169,185 | B2 | 5/2012 | Partovi et al. |
| 8,222,990 | B2 | 7/2012 | Gerner |
| 8,330,414 | B2 | 12/2012 | Takahashi et al. |
| 8,441,244 | B2 | 5/2013 | Bianco et al. |
| 8,446,046 | B2 | 5/2013 | Fells et al. |
| 8,531,153 | B2 | 9/2013 | Baarman et al. |
| 8,587,279 | B2 | 11/2013 | Wang et al. |
| 8,629,652 | B2 | 1/2014 | Partovi et al. |
| 8,629,654 | B2 | 1/2014 | Partovi et al. |
| 8,890,453 | B2 | 11/2014 | Kure |
| 8,890,470 | B2 | 11/2014 | Partovi |
| 8,896,264 | B2 | 11/2014 | Partovi |
| 8,901,881 | B2 | 12/2014 | Partovi |
| 8,928,276 | B2 | 1/2015 | Kesler et al. |
| 8,933,594 | B2 | 1/2015 | Kurs et al. |
| 8,942,624 | B2 | 1/2015 | Singh et al. |
| 8,947,047 | B2 | 2/2015 | Partovi |
| 8,963,514 | B2 | 2/2015 | Rehm |
| 9,000,620 | B2 | 4/2015 | Kim et al. |
| 9,018,898 | B2 | 4/2015 | Ziv et al. |
| 9,087,638 | B2 | 7/2015 | Oettinger |
| 9,106,083 | B2 | 8/2015 | Partovi |
| 9,112,362 | B2 | 8/2015 | Partovi |
| 9,112,363 | B2 | 8/2015 | Partovi |
| 9,112,364 | B2 | 8/2015 | Partovi |
| 9,178,369 | B2 | 11/2015 | Partovi |
| 9,178,387 | B2 | 11/2015 | Mohammadian et al. |
| 9,178,512 | B2 | 11/2015 | Froniewski et al. |
| 9,209,627 | B2 | 12/2015 | Baarman et al. |
| 9,257,851 | B2 | 2/2016 | Baarman et al. |
| 9,276,437 | B2 | 3/2016 | Partovi et al. |
| 9,331,694 | B2 | 5/2016 | Li et al. |
| 9,356,472 | B2 | 5/2016 | Fritsch |
| 9,356,659 | B2 | 5/2016 | Partovi |
| 9,362,779 | B2 | 6/2016 | Takahashi et al. |
| 9,407,109 | B2 | 8/2016 | Takahashi et al. |
| 9,461,501 | B2 | 10/2016 | Partovi et al. |
| 9,496,793 | B2 | 11/2016 | Bruwer et al. |
| 9,509,168 | B2 | 11/2016 | Ye et al. |
| 9,673,784 | B2 | 6/2017 | Menzel et al. |
| 9,729,009 | B2 | 8/2017 | Fritsch |
| 9,735,837 | B2 * | 8/2017 | Juan ............ H02J 7/0072 |
| 9,806,542 | B2 | 10/2017 | Asanuma et al. |
| 9,897,989 | B2 | 2/2018 | Fitch |
| 10,008,884 | B2 | 6/2018 | Zhang |
| 10,027,185 | B2 | 7/2018 | Moyer et al. |
| 10,608,474 | B2 * | 3/2020 | Schaevitz ............ H02J 50/40 |
| 2009/0040580 | A1 | 2/2009 | Mukawa |
| 2009/0243397 | A1 | 10/2009 | Cook et al. |
| 2010/0259217 | A1 | 10/2010 | Baarman et al. |
| 2011/0050164 | A1 | 3/2011 | Partovi et al. |
| 2011/0175458 | A1 | 7/2011 | Baarman |
| 2011/0221385 | A1 | 9/2011 | Partovi et al. |
| 2012/0068548 | A1 | 3/2012 | Endo et al. |
| 2012/0139359 | A1 | 6/2012 | Lai et al. |
| 2013/0093388 | A1 | 4/2013 | Partovi |
| 2013/0099563 | A1 | 4/2013 | Partovi |
| 2013/0147280 | A1 * | 6/2013 | Oettinger ............ H02J 7/025 |
| | | | 307/104 |
| 2013/0162051 | A1 | 6/2013 | Michihata et al. |
| 2013/0260677 | A1 | 10/2013 | Partovi |
| 2013/0271069 | A1 | 10/2013 | Partovi |
| 2013/0285604 | A1 | 10/2013 | Partovi |
| 2013/0285605 | A1 | 10/2013 | Partovi |
| 2013/0300204 | A1 | 11/2013 | Partovi |
| 2014/0103732 | A1 | 4/2014 | Irie et al. |
| 2014/0132210 | A1 | 5/2014 | Partovi |
| 2014/0191568 | A1 | 7/2014 | Partovi |
| 2014/0306654 | A1 | 10/2014 | Partovi |
| 2015/0061588 | A1 | 3/2015 | Alves et al. |
| 2015/0097438 | A1 | 4/2015 | Aioanei |
| 2015/0097443 | A1 | 4/2015 | Moyer et al. |
| 2015/0130412 | A1 | 5/2015 | Partovi |
| 2015/0137617 | A1 | 5/2015 | Menzel et al. |
| 2015/0194814 | A1 | 7/2015 | Taylor et al. |
| 2015/0244341 | A1 | 8/2015 | Ritter et al. |
| 2015/0249359 | A1 | 9/2015 | Gunderson |
| 2015/0303699 | A1 | 10/2015 | Wagman et al. |
| 2015/0357827 | A1 | 12/2015 | Muratov et al. |
| 2016/0094074 | A1 | 3/2016 | Alves et al. |
| 2016/0134134 | A1 | 5/2016 | Baarman et al. |
| 2016/0172895 | A1 | 6/2016 | Lee et al. |
| 2017/0093218 | A1 | 3/2017 | Hrinya et al. |
| 2017/0126280 | A1 * | 5/2017 | Juan ............ H02J 50/10 |
| 2017/0250573 | A1 | 8/2017 | Olyunin et al. |
| 2017/0272058 | A1 | 9/2017 | Menzel et al. |
| 2017/0288467 | A1 | 10/2017 | Hrinya et al. |
| 2017/0294807 | A1 | 10/2017 | Van Den Brink et al. |
| 2018/0006495 | A1 | 1/2018 | Carobolante et al. |
| 2018/0062409 | A1 * | 3/2018 | Jung ............ H02J 7/342 |
| 2018/0159371 | A1 * | 6/2018 | Kim ............ H02J 50/10 |

FOREIGN PATENT DOCUMENTS

| | | |
|---|---|---|
| CN | 101621220 A | 1/2010 |
| CN | 101902062 A | 12/2010 |
| CN | 102934319 B | 2/2013 |
| CN | 103427499 B | 12/2013 |
| JP | H0767263 A | 3/1995 |
| JP | 2010213414 A | 9/2010 |
| JP | 2012005238 A | 1/2012 |
| JP | 2013169081 A | 8/2013 |
| KR | 20100110356 A | 10/2010 |
| KR | 20130106840 A | 9/2013 |
| WO | 99/52002 A1 | 10/1999 |
| WO | 08/044875 A1 | 4/2008 |
| WO | 2011/102910 A1 | 8/2011 |
| WO | 13/090565 A1 | 6/2013 |
| WO | 13/142720 A1 | 9/2013 |

OTHER PUBLICATIONS

Author Unknown, "System Description Wireless Power Transfer," vol. I: Low Power, Part 1: Interface Definition, Version 1.0.1, Wireless Power Consortium, 86 pages, Oct. 2010.
Author Unknown, "System Description Wireless Power Transfer," vol. I: Low Power, Part 1: Interface Definition, Version 1.1.1, Wireless Power Consortium, 248 pages, Jul. 2012.
Johns et al., "Designing a Qi-compliant receiver coil for wireless power systems, Part 1," Texas Instruments Incorporated, High- (56) References Cited

OTHER PUBLICATIONS

Performance Analog Products, Analog Applications Journal, www.ti.com/aaj, 9 pages, 3Q 2012.

* cited by examiner

WIRELESS CHARGING SYSTEM WITH DUTY CYCLE CONTROL

This application claims the benefit of provisional patent application No. 62/453,861, filed Feb. 2, 2017, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to a portable electronic device. The portable electronic device receives the wirelessly transmitted power and uses this power to charge an internal battery and power components. It can be challenging to regulate the flow of wireless power in a wireless charging system. If care is not taken, wireless power transfer efficiency may not be optimized and power delivery requirements may not be satisfied.

SUMMARY

A wireless power transmitting device transmits wireless power signals to a wireless power receiving device by supplying drive signals with a duty cycle to a wireless power transmitting coil. During operation, the wireless power receiving device wirelessly controls the wireless power transmitting device to help enhance wireless power transfer efficiency.

The wireless power receiving device has a rectifier and a wireless power receiving coil. The wireless power receiving coil receives wireless power signals having the duty cycle from the wireless power transmitting device. The rectifier is coupled to a power circuit (e.g., an integrated circuit) such as a battery charger integrated circuit. The battery charger circuit is coupled to a battery to charge the battery.

The amount of current drawn by the battery charger circuit from the rectifier is adjustable. During operation, control circuitry in the wireless power receiving device sets the current to multiple different values while using sensor circuitry that is coupled between the rectifier and the battery charger circuit to measure output power from the rectifier. A satisfactory value for the duty cycle can be identified by adjusting the duty cycle while observing when peaks arise in the output power across the different current values.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current drive signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

The wireless power system uses a control scheme that helps enhance wireless power transfer efficiency while satisfying power demands from the wireless power receiving device. During operation, the wireless power receiving device makes changes to the current drawn by a battery charger circuit in the wireless power receiving device and makes duty cycle adjustments to the wireless power transmitting device drive signals and wireless power signals while monitoring output power from the rectifier circuitry with sensor circuitry.

Figure 1:
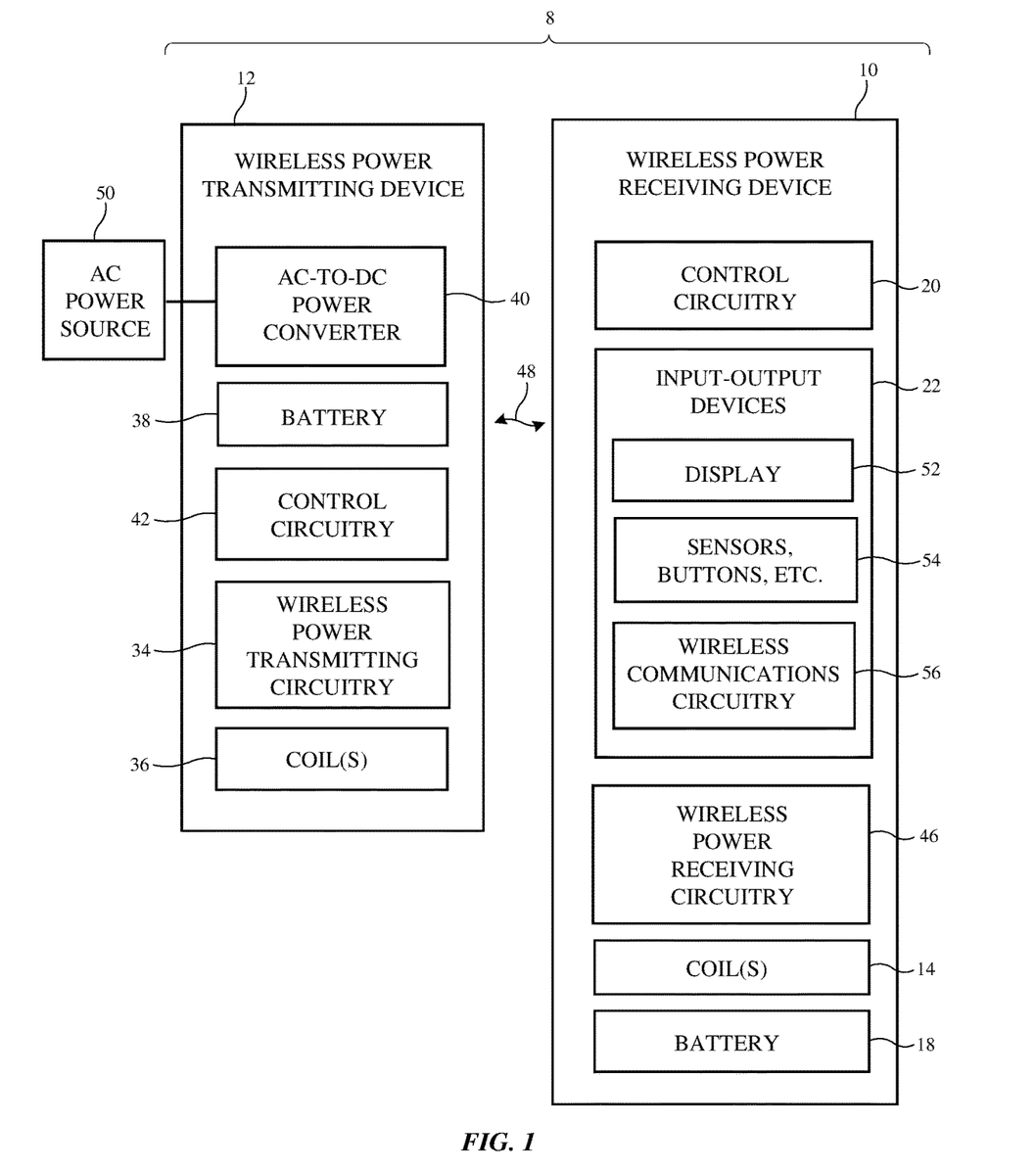
FIG. 1 is a schematic diagram of an illustrative wireless charging system in accordance with some embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations are sometimes be described herein as examples.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as alternating-current-to-direct current (AC-DC) power converter 40 can convert power from a mains power source or other alternating-current (AC) power source into direct-current (DC) power that is used to power control circuitry 42 and other circuitry in device 12. During operation, control circuitry 42 uses wireless power transmitting circuitry 34 and one or more coil(s) 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals (drive signals) through coil(s) 36. As the AC currents pass through coil(s) 36, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from coil(s) 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with control circuitry 42 of device 12 and/or other equipment, audio components, and other components (e.g., input-output devices 22 and/or control circuitry 20) and are used in charging an internal battery in device 10 such as battery 18.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and 20 may be configured to support wireless communications between devices 12 and 10 (e.g., circuits 42 and/or 20 may include wireless communications circuitry such as circuitry 56). Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly during operation of system 8. Devices 10 and 12 may, for example, have wireless transceiver circuitry in control circuitry 42 and 20 (see, e.g., wireless communications circuitry such as circuitry 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

Figure 2:
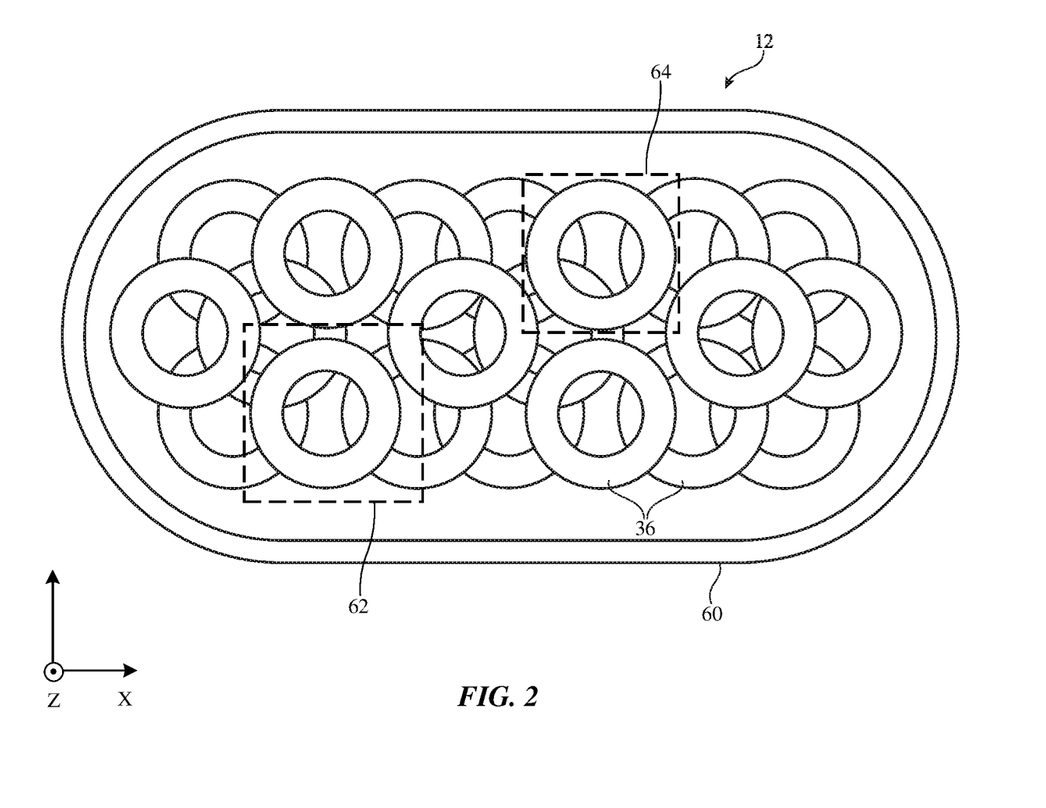
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 36 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

During operation, a user places one or more devices 10 on charging surface 60 in locations such as locations 62 and 64. The position at which a device 10 is located on surface 60 affects alignment between the coil 14 in that device and coil(s) 36 in device 12. Variations in alignment, in turn, affect magnetic coupling (coupling coefficient k) between the coils in devices 12 and 10. In addition to variations in coupling coefficient k, the amount of power that is desired by device 10 at any given point in time may vary. For example, device 10 may wish to draw a relatively large amount of power to charge battery 18 when battery 18 is depleted and may wish to draw a relatively small amount of power when battery 18 is fully charged. Due to variations in operating conditions in system 8 such as changes in coupling coefficient k and desired power draw (desired rectifier output power) in device 10, wireless charging system performance will vary. As an example, wireless power transfer efficiency will vary as operating conditions change. System 8 therefore makes real-time adjustments to system operating parameters such as the duty cycle of the alternating-current drive signal that drives current through coil(s) 36. These adjustments may help enhance wireless power transfer efficiency while supplying a battery charger or other components in device 10 with desired amounts of power.

Figure 3:
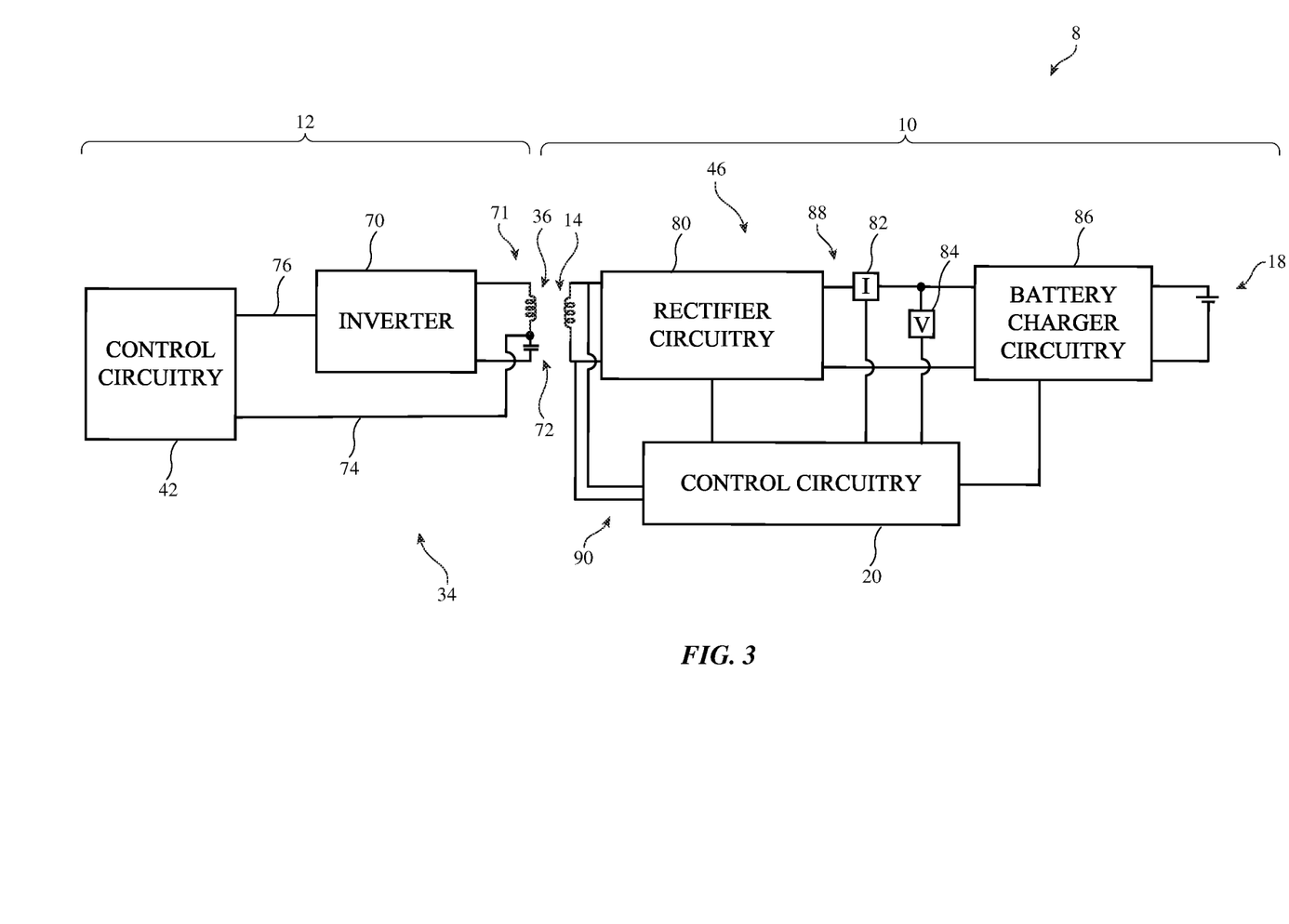
FIG. 3 is a circuit diagram of an illustrative wireless charging system in accordance with an embodiment.

A circuit diagram of illustrative circuitry for wireless power transfer (wireless power charging) system 8 is shown in FIG. 3. As shown in FIG. 3, wireless power transmitting circuitry 34 includes an inverter such as inverter 70 or other drive circuit that produces alternating-current drive signals such as variable duty-cycle square waves. These signals are driven through an output circuit that includes coil(s) 36 and capacitor(s) 72 to produce wireless power signals with the same variable duty cycle that are transmitted wirelessly to device 10. A single coil 36 is shown in the example of FIG. 3. In general, device 12 may have any suitable number of coils (1-100, more than 5, more than 10, fewer than 40, fewer than 30, 5-25, etc.). Switching circuitry (sometimes referred to as multiplexer circuitry) that is controlled by control circuitry 42 can be located before and/or after each coil 36 and/or before and/or after the other components of output circuit 71 and can be used to switch desired sets of one or more coils 36 (desired output circuits 71) into or out of use. For example, if it is determined that device 10 is located in location 62 of FIG. 2, the coil(s) overlapping device 10 at location 62 may be activated during wireless power transmission operations while other coils 36 (e.g., coils not overlapped by device 10 in this example) are turned off.

Control circuitry 42 and control circuitry 20 contain wireless transceiver circuits (e.g., circuits such as wireless communication circuitry 56 of FIG. 1) for supporting wireless data transmission between devices 12 and 10. In device 10, control circuitry 20 can use path 90 and coil 14 to transmit data to device 12. In device 12, paths such as path 74 may be used to supply incoming data signals that have been received from device 10 using coil 36 to demodulating (receiver) circuitry in the communications circuitry of control circuitry 42. If desired, path 74 may be used in transmitting wireless data to device 10 with coil 36 that is received by receiver circuitry in control circuitry 20 using coil 14 and path 90. Configurations in which control circuitry 20 and control circuitry 42 have antennas that are separate from coils 36 and 14 may also be used for supporting unidirectional and/or bidirectional wireless communications between devices 12 and 10, if desired.

During wireless power transmission operations, transistors in inverter 70 are controlled using AC control signals from control circuitry 42. Control circuitry 42 can use control path 76 to supply control signals to the gates of the transistors in inverter 70. The duty cycle of these control signals and therefore the duty cycle of the drive signals applied by inverter 70 to coil 36 and the resulting duty cycle of the corresponding wireless power signals produced by coil 36 can be adjusted dynamically.

Wireless power receiving device 10 has wireless power receiving circuitry 46. Circuitry 46 includes rectifier circuitry 80 (e.g., a synchronous rectifier controlled by signals from control circuitry 20) that converts received alternating-current signals from coil 14 (e.g., wireless power signals received by coil 14) into direct-current (DC) power signals for battery charger circuitry 86 and other input-output devices 22. A power circuit such as battery charger circuitry 86 (e.g., a battery charging integrated circuit or other power management integrated circuit or integrated circuits) receives power from rectifier circuitry 80 and regulates the flow of this power to battery 18. Control circuitry 20 (e.g., control circuitry in a battery charging integrated circuit and/or separate control circuitry) adjusts operating parameters for charger circuitry 86. For example, control circuitry 20 supplies control signals to battery charger circuitry 86 that adjust the current draw and therefore the power draw of battery charger circuitry 86 from rectifier circuitry 80 in real time. The amount of current Iout flowing on path 88 between rectifier circuitry 80 and battery charger circuitry 86 and the voltage Vout on path 88 can be measured by control circuitry 20 using sensor circuitry such as current sensor 82 and voltage sensor 84. Control circuitry 20 measures output power Pout by determining the product of Iout and Vout.

Figure 4:
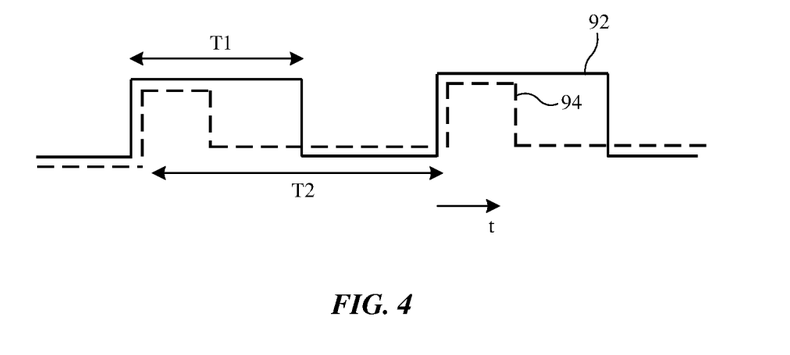
FIG. 4 is a graph showing how the duty cycle of a wireless charging system drive signal and associated wireless power signal transmitted by a wireless power transmitting coil and received by a wireless power receiving coil may be varied during operation in accordance with an embodiment.

FIG. 4 is a graph of illustrative alternating-current drive signals being applied by inverter 70 to coil 36. The duty cycle of the drive signal is defined as the ratio of on time T1 to total time T2 in each period. The length of T2 may correspond to an operating frequency for the drive signal of between 100 and 500 kHz, 360 kHz, less than 400 kHz, more than 200 kHz, or other suitable frequency. In the example of FIG. 4, signal 92 has a first duty cycle (e.g., 50%) and signal 94 has a second duty cycle (e.g., 25%). In general, control circuitry 42 can make adjustments to the control signals on path 76 so that any suitable duty cycle (e.g., a duty cycle of 0-50%) is produced by inverter 70 during wireless power transmission.

Figure 5:
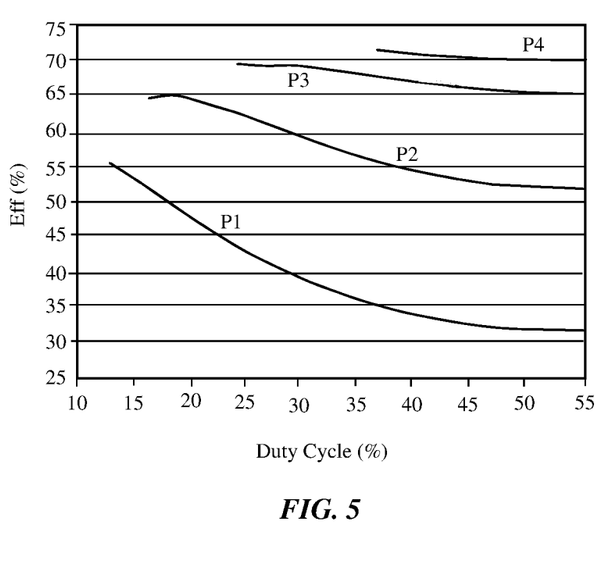
FIGS. 5 and 6 are graphs in which wireless power transfer efficiency has been plotted as a function of drive signal duty cycle in two different respective coupling coefficient scenarios in accordance with an embodiment.
Figure 6:
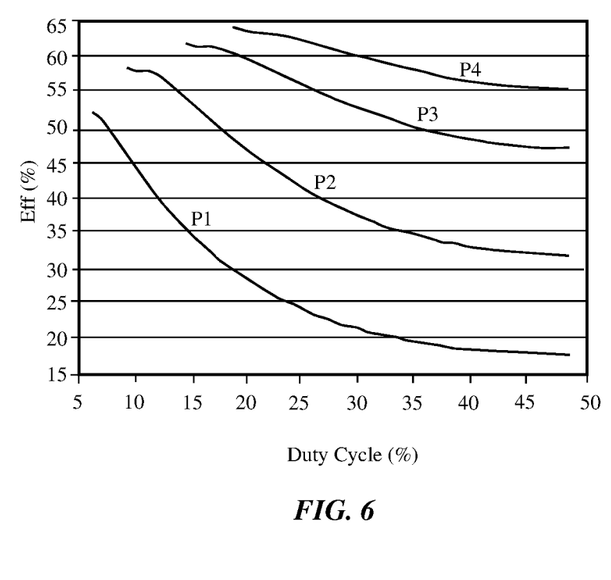

Due to factors such as the location of device 10 on surface 60 relative to coil(s) 36, coupling coefficient k between coil(s) 36 and coil 14 varies between charging events. The Q factor of coils 36 and 14 may vary between devices. This can affect wireless power transfer efficiency between device 12 and device 10. The graphs of FIGS. 5 and 6 illustrate how variations in coupling coefficient k affect wireless power transfer efficiency (Eff) between devices 12 and 10. The curves of FIG. 5 corresponding to a higher coupling coefficient (stronger coupling) than the curves of FIG. 6 (which correspond to a weak coupling scenario). In each graph, efficiency Eff has been plotted as a function of coil drive signal duty cycle (DC) for four different amounts of power (Pout) being delivered between circuitry 80 and circuitry 86 of FIG. 3 (e.g., P1, P2, P3, and P4). With one illustrative configuration, P1 is 1 W, P2, is 2.5 W, P3 is 5 W, and P4 is 7.5 W. Each of the curves in FIGS. 5 and 6 exhibits a general increase in power transfer efficiency with decreasing duty cycle until further efficiency increases are no longer possible (the left-hand ends of the curves). Further efficiency increases from further reductions in duty cycle are not possible because the desired amount of power (P1, P2, P3, or P4 in this example) cannot be delivered to circuitry 86 and battery 18 under those operating conditions (e.g., the voltage Vout from circuit 80 and therefore Pout drops when too much current is drawn by circuit 86). The graphs of FIGS. 5 and 6 demonstrate that maximum system efficiency depends on coupling coefficient k, load power demand (P1, P2, P3, P4, etc.), and duty cycle. For a fixed load power (Pout), efficiency generally increases as inverter duty cycle decreases, but system 8 will not be able to meet certain load power demands when duty cycle is too low.

To identify satisfactory operating conditions for system 8, control circuitry 20 dynamically adjusts the requested current draw (sometimes referred to as Iref) for battery charger circuitry 86, thereby adjusting the output current Iout of rectifier circuitry 80 and the amount of power (Pout=Vout*Iout) that is delivered to the load of device 10 (charger 86 and battery 18 in the example of FIG. 3). The values of Pout that are produced across a range of various Iref values will depend of duty cycle, as shown in FIG. 7.

Figure 7:
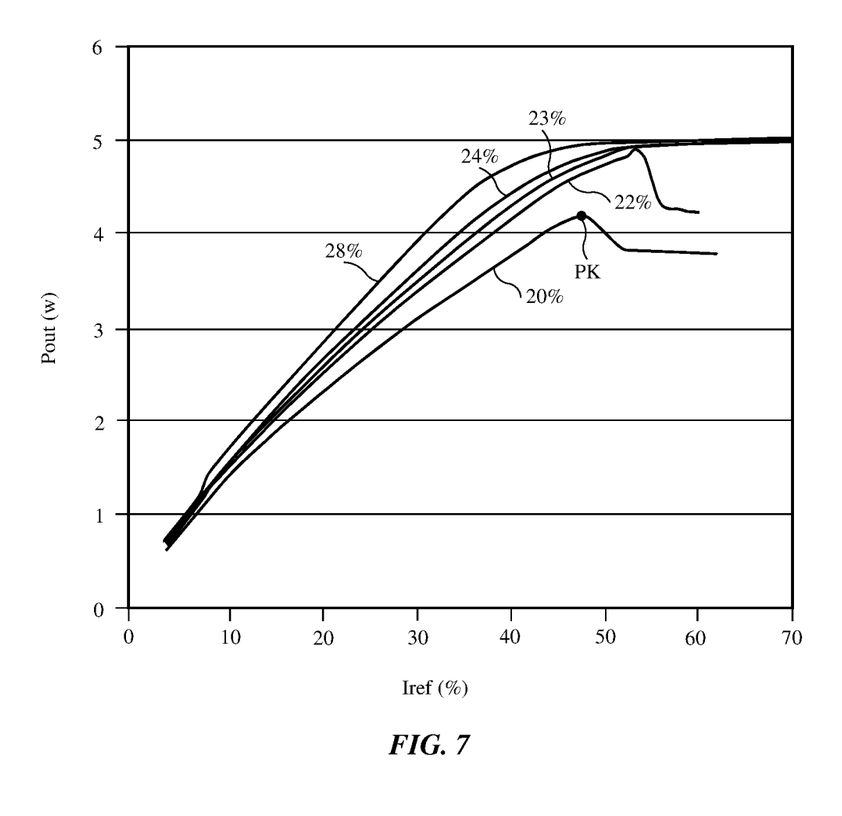
FIG. 7 is a graph in which wireless power receiving circuit output power has been plotted as a function of battery charger current for different drive signal duty cycles in accordance with an embodiment.
Figure 8:
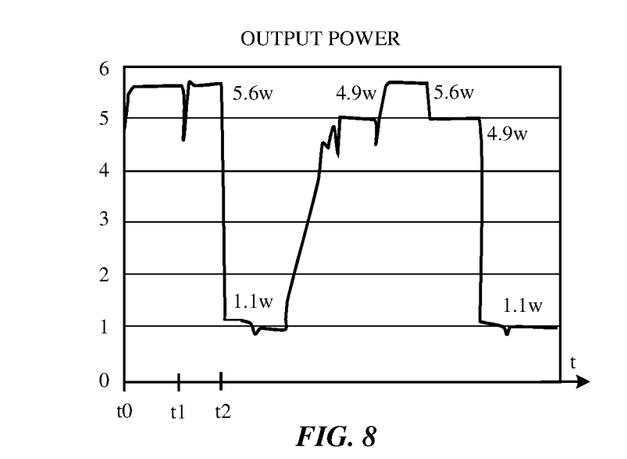
FIGS. 8, 9, 10, and 11 show respectively how wireless power receiving circuit output power, wireless charging system drive signal duty cycle, wireless power transfer efficiency, and wireless power receiving circuit output voltage may vary as a function of time in an illustrative usage scenario in accordance with an embodiment.

In the example of FIG. 7, Pout has been plotted as a function of current between circuit 80 and circuit 86 (Iref=Iout). Each of the curves in FIG. 7 corresponds to a different duty cycle (e.g., 20%, 22%, 23%, 24%, or 28%). For lower duty cycles (e.g., 20% and 22% in this example), rectifier output power Pout increases as rectifier output current Iout (battery charger input current Iref) increases, then decreases after reaching a peak value. For higher duty cycles (e.g., 23%, 24%, or 28%), Pout increases as Iout and Iref increase then remain at the load power level. Pout may be used to power battery charger 86 (as shown in FIG. 3) and/or other components (see, e.g., input-output devices 22 of FIG. 1). In situations in which the duty cycle is sufficiently high to supply a desired level of Pout, Pout will not exhibit a peak. If the duty cycle is insufficient, Pout will peak across multiple current values.

Control circuitry 20 can exploit this behavior when searching for a satisfactory duty cycle for use in operating system 8 to supply a desired amount of power to the load of device 10 (charger circuitry 86). In particular, control circuitry 20 can measure Pout while sweeping the current Iout across multiple values at each of multiple different duty cycles. Control circuitry 20 can use these measurements to find the maximum duty cycle that exhibits a peak in Pout. The minimum duty cycle for use in supplying the desired amount of power to the load of device 10 can then be set to a duty cycle value that is just above the maximum duty cycle that exhibits the peak (e.g., one step above the maximum duty cycle, where the step size is 0.1%-1%, less than 0.2%, more than 0.05%, or other duty cycle step size). This control scheme allows system 8 to enhance system performance by lowering duty cycle whenever possible to increase efficiency while ensuring that a currently desired power can be delivered to circuit 86. As the currently desired power for circuit 86 changes during operation (e.g., because battery 18 becomes fully charged), the search for the satisfactory operating duty cycle can be updated accordingly. Duty cycle fine tuning operations may also be performed (e.g., by making fine adjustments to the duty cycle that has been identified to help further optimize efficiency).

Figure 9:
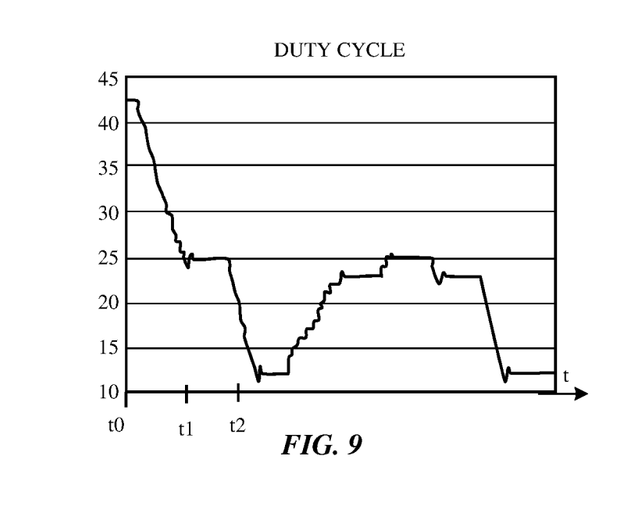
Figure 10:
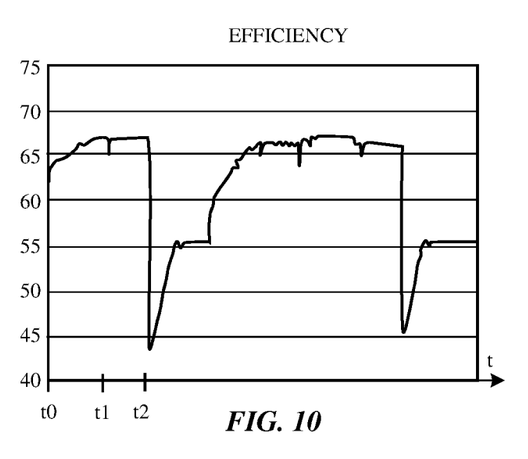
Figure 11:
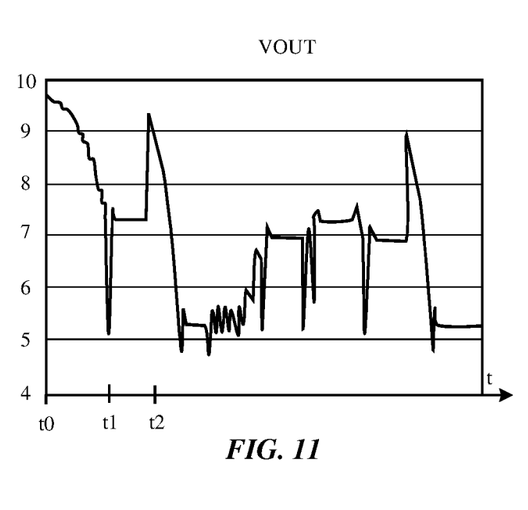

FIGS. 8, 9, 10, and 11 show how duty cycle (FIG. 9) may be adjusted to enhance efficiency (FIG. 10). In this example, the desired power for circuit 86 varies as a function of time. Control circuitry 20 can obtain information on the currently desired power for circuitry 86 from circuit 86 (as an example). Initially (time t=t0), battery 18 is depleted. As a result, the amount of power that is desired by battery charger 86 is relatively high (5.6 W). This desire for high power is present between times t0 and t1 in FIG. 8. During this time period, control circuitry 20 lowers the inverter duty cycle from 42% to 25% as shown in FIG. 9, thereby increasing efficiency from 64% to 68% as shown in FIG. 10. At time t1, the duty cycle has been lowered so much that it is no longer possible to supply the desired output power. This is illustrated by the drop in output voltage Vout at time t1 and the associated momentary drop in Pout from circuit 80. Control circuitry 20 can use sensor circuitry such as sensors 82 and 84 to measure the current (Iout) and voltage (Vout) associated with the power signals being supplied from rectifier circuitry 80. When it is determined that the duty cycle can no longer be lowered without adversely affecting the ability to supply a desired value of Pout to circuit 86, further reductions in duty cycle can be halted. As shown in FIG. 9, for example, control circuitry 20 can maintain the duty cycle at a satisfactory constant level between times t1 and t2.

At times greater than t2, the amount of power desired by battery charger circuit 86 continues to fluctuate and control circuitry 20 responds accordingly. Control circuitry 20 can decrease the duty cycle whenever possible to enhance efficiency and can increase the duty cycle whenever necessary to ensure that the currently desired power is satisfactorily supplied to circuitry 86.

Figure 12:
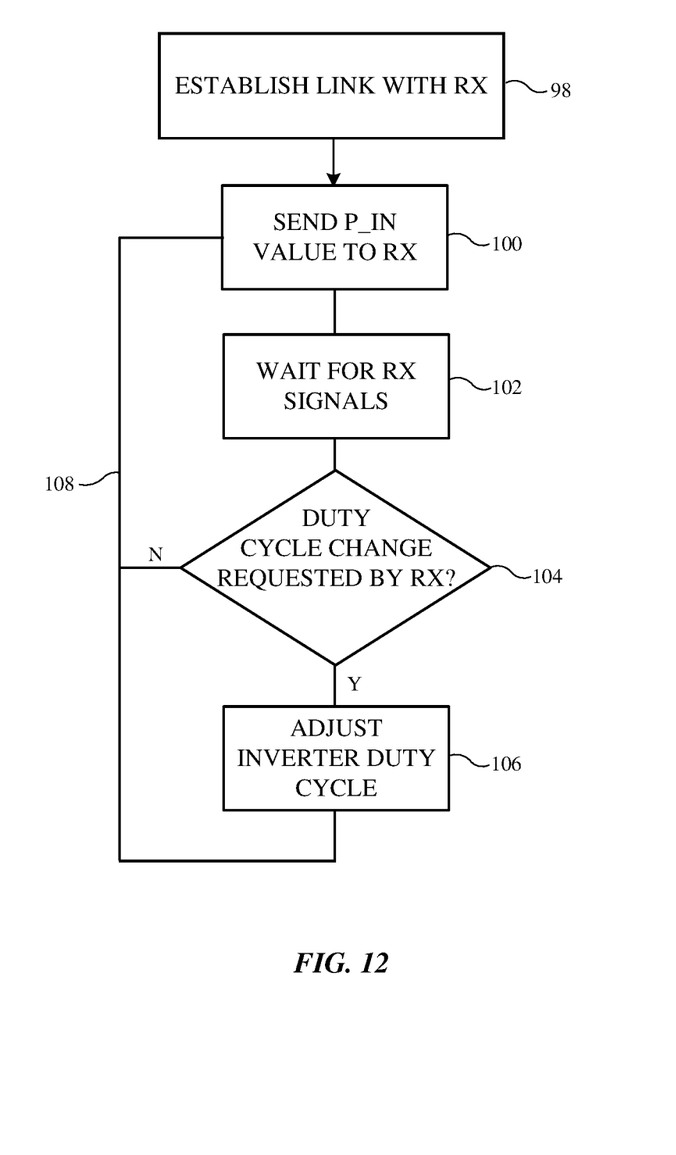
FIG. 12 is a flow chart of illustrative operations that may be performed by a wireless power transmitting device in accordance with an embodiment.
Figure 13:
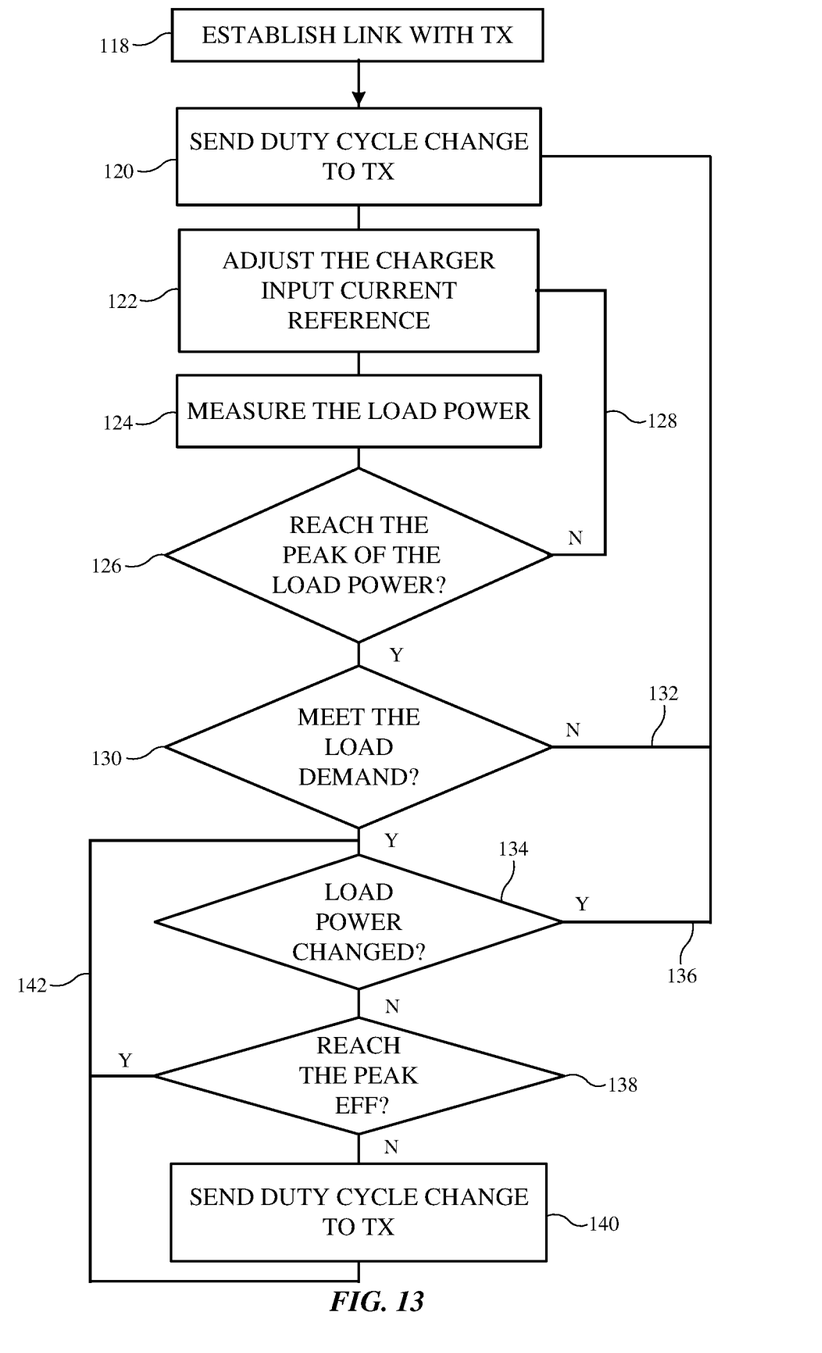
FIG. 13 is a flow chart of illustrative operations that may be performed by a wireless power receiving device in accordance with an embodiment.

FIGS. 12 and 13 are flow charts of illustrative operations involved in controlling system 8. Initially, a user places device 10 on surface 60 of device 12. Device 12 may contain a foreign object detection system (e.g., a detection circuit coupled to coil 36 or a detection system using a separate set of coils) that detects when device 10 has been placed on surface 60. In response to detection that device 10 is present in the vicinity of device 12, device 12 and device 10 establish a wireless communications link (blocks 98 and 118 of FIGS. 12 and 13). During subsequent operations, device 10 uses the communications link to send information to device 12 and device 12 uses the communications link to send information to device 10. The information that is conveyed over the communications link includes control commands, sensor data, required power settings, operating parameters, and/or other information.

The communications link allows devices 10 and 12 to establish initial operating conditions. For example, the communications link allows device 12 to inform device 10 of the power delivery capabilities of device 12 (e.g., "current maximum available power is 5.6 W"). The communications link also allows device 10 to receive this information from device 12 and to acknowledge the received information. The link allows devices 10 and 12 to identify each other and confirm that control operations can be performed securely.

Device 10 can set initial operating parameters during the operations of block 118. For example, battery charger circuitry 86 can use information on the current charge status of battery 18 or other information to establish a desired level of power to receive from circuitry 80 and to use in charging battery 18. If battery 18 is depleted and should be rapidly charged, the desired operating power for circuitry 86 (sometimes referred to as load power or load demand) may be set to be equal to the maximum available wireless power from device 12. If battery 18 is nearly full, the desired load power can be set to a lower level (e.g., 1.0 W). Battery charger circuitry 86 can monitor the state of battery 18 in real time and can update the current desired level of power for battery charger circuitry 86 accordingly.

After the wireless communications link has been established between devices 12 and 10 and desired authentication operations have been satisfactorily performed, wireless charging can begin. During charging, device 12 serves as a slave while device 10 serves as a master. As shown in FIG. 12, for example, after device 12 provides its current maximum available power level (P_in) to device 10 at block 100, device 12 waits for signals from device 10 at block 102 and analyzes information from device 10 at block 104 to determine whether a duty cycle change request has been received from device 10. In the absence of a duty cycle change request, control can loop back to block 100, as shown by line 108. In response to receiving a request from device 10 to change the inverter duty cycle, control circuitry 42 of device 12 adjusts the duty cycle of the control signals supplied to inverter 70 over control signal path 76, thereby adjusting the duty cycle of the corresponding drive signals supplied by inverter 70 to output circuit 71 and the corresponding duty cycle of the wireless power signals transmitted from device 12 to device 10.

The flow chart of FIG. 13 illustrates the control scheme used by device 10 and system 8. The flow chart of FIG. 13 shows how device 10 implements three control loops: a peak power point loop, a load power loop, and a peak efficiency loop.

During the peak power point loop (blocks 122, 124, and 126 and line 128), the current flowing between circuits 80 and 86 is adjusted (e.g., the current is swept across multiple values ranging from a low value to a high value) while control circuitry 20 uses sensing circuitry 82 and 84 to monitors output power (Pout) on path 88 (e.g., by measuring current Iout and output voltage Vout and by determining the product of Iout and Vout). This allows control circuitry 20 to identify whether a peak in output power Pout exists for the current duty cycle setting.

During the load power loop (block 130, line 132, and block 120) control circuitry 20 determines whether the currently desired power can be supplied at the current duty cycle setting.

During the peak efficiency loop (blocks 134, 138, 140, and line 142), control circuitry 20 makes fine-tuning adjustments to the duty cycle to help increase efficiency.

At block 120, device 10 uses control circuitry 20 to send a duty cycle change request (e.g., a duty cycle increment or a duty cycle decrement command) to device 12.

As shown in FIG. 13, a duty cycle setting for system 8 is selected at block 120. During the operations of block 120, control circuitry 20 uses wireless communications circuitry to wirelessly send a duty cycle change request for the selected duty cycle to the wireless communications circuitry of control circuitry 42.

During the operations of blocks 122, 124, and 126, device 10 sweeps the value of the current flowing between circuit 80 and 86 (current Iout=Iref) between first and second current values. The current is adjusted by controlling the current draw of circuitry 86 using control circuitry 20. While the current is swept across multiple different values, control circuitry 20 uses sensing circuitry such as current sensor 82 and voltage sensor 84 to monitor the output power Pout from circuitry 80 and to identify any peaks in Pout (as a function of current) of the type shown in FIG. 7.

At block 122, device 10 adjusts reference current Iref to battery charger circuitry 86, thereby adjusting Iout flowing between rectifier circuitry 80 and battery charger circuitry 86. The output power Pout resulting from this adjustment is measured at block 124. In particular, sensors 82 and 84 gather Iout and Vout measurements, which control circuitry 20 multiplies together to determine Pout (the power flowing from rectifier circuitry 80 into the load of device 10 (battery charger circuitry 86 and battery 18). As indicated by block 126 and line 128, the value of Iref is incrementally adjusted to sweep across a range of Iref values until a peak is detected. As an example, Iref may be swept across a range of Iref values to detect peak PK of the 20% duty cycle curve of FIG. 7.

During the operations of block 130, control circuitry determines whether the peak value of Pout is sufficient to satisfy the amount of power currently desired by battery charger circuitry 86. If the currently desired power level can be satisfied at the currently selected duty cycle, that duty cycle may be considered to be the maximum duty cycle that satisfies the desired power level while exhibiting a peak power. The operating duty cycle can then be maintained at this maximum value or set just above this maximum value (e.g., to a higher duty cycle that is a step above this maximum value). Processing can then proceed to block 134. If the currently desired power level cannot be satisfied at the currently selected duty cycle (e.g., if peak PK of FIG. 7 is below the desired power level for circuitry 86), processing can loop back to block 120 as indicated by line 132 so that a larger trial duty cycle can be established.

Once the operations of block 130 determine that for a given duty cycle the demanded load power has been satisfactorily provided at the peak, control circuitry 20 can conclude that the current duty cycle corresponds to the minimum duty cycle that can deliver the desired power to the load (the load power loop is complete). Processing can then proceed to block 134.

During the operations of block 134, control circuitry 20 determines whether any change has been made to the desired load power. For example, the desired load power may decrease if battery 18 becomes fully charged or may increase if additional components are used that drain battery 18. If the load power has changed, processing loops back to block 120, as indicated by line 136.

If the load power has not changed, processing can proceed to the peak efficiency point loop to fine tune inverter duty cycle to maximize system efficiency. In particular, processing can proceed to block 138. During the operations of block 138, control circuitry 20 determines whether the peak efficiency (Eff of FIGS. 5 and 6) has been reached. If not, control circuitry 20 can adjust the duty cycle by sending an appropriate duty cycle change request to device 12 at block 140. Processing can then loop back to block 134, as indicated by line 142. If the peak efficiency has been reached, the operations of block 140 can be omitted.

The foregoing is illustrative and various modifications can be made to the described embodiments. The foregoing embodiments may be implemented individually or in any combination.

What is claimed is:

1. A wireless power receiving device configured to receive power from a wireless power transmitting device that has an inverter configured to supply a drive signal with an associated duty cycle and that has at least one wireless power transmitting coil configured to receive the drive signal and to transmit corresponding wireless power signals to the wireless power receiving device, the wireless power receiving device comprising:
   a wireless power receiving coil configured to receive the wireless power signals;
   rectifier circuitry coupled to the wireless power receiving coil that is configured to supply output power based on the received wireless power signals;
   battery charger circuitry configured to receive the output power, wherein the battery charger circuitry is configured to receive a current from the rectifier circuitry; and
   control circuitry configured to:
      adjust the current received by the battery charger circuitry to a set of current values to identify a corresponding output power value for each current value in the set of current values, the corresponding output power value being the output power supplied by the rectifier circuitry,
      identify a peak in the output power based on the corresponding output power values exhibited by adjusting the current to the set of current values, and
      in response to identifying the peak, determine whether a desired power is being supplied to the battery charger at the peak.

2. The wireless power receiving device defined in claim 1 wherein the control circuitry is further configured to provide duty cycle change requests to the wireless power transmitting device that direct the wireless power transmitting device to adjust the duty cycle of the drive signal.

3. The wireless power receiving device defined in claim 2 wherein the control circuitry is configured to provide the duty cycle change requests to the wireless power transmitting device at least partly in response to determining that the desired power is being supplied to the battery charger at the peak.

4. The wireless power receiving device defined in claim 3 wherein the control circuitry is coupled to the wireless power receiving coil and wherein the control circuitry is configured to transmit the duty cycle change requests to the wireless power transmitting device using the wireless power receiving coil.

5. The wireless power receiving device defined in claim 3 wherein the control circuitry is configured to wirelessly transmit the duty cycle change requests to the wireless power transmitting device.

6. The wireless power receiving device defined in claim 2 wherein the control circuitry is configured to provide the duty cycle change requests to the wireless power transmitting device at least partly in response to determining that the desired power is not being supplied to the battery charger at the peak.

7. The wireless power receiving device defined in claim 1 wherein adjusting the current comprises adjusting a maximum current drawn by the battery charger circuitry from the rectifier circuitry.

8. The wireless power receiving device defined in claim 1 further comprising sensor circuitry that is coupled between the rectifier circuitry and the battery charger circuitry.

9. The wireless power receiving device defined in claim 8 wherein the sensor circuitry comprises a current sensor that measures the current and a voltage sensor.

10. The wireless power receiving device defined in claim 8 wherein the control circuitry is configured to measure the output power using the sensor circuitry.

11. The wireless power receiving device defined in claim 1 further comprising:
a display coupled to the control circuitry.

12. The wireless power receiving device defined in claim 1 further comprising:
a battery, wherein the battery charger circuitry is configured to charge the battery.

13. A wireless power receiving device configured to receive power from a wireless power transmitting device having a wireless power transmitting coil that is configured to receive drive signals having a duty cycle and produce corresponding wireless power signals with the duty cycle, the wireless power receiving device comprising:
a wireless power receiving coil configured to receive the wireless power signals from the wireless power transmitting device;
rectifier circuitry coupled to the wireless power receiving coil that is configured to supply output power based on the received wireless power signals;
battery charger circuitry configured to receive the output power, wherein the battery charger circuitry is configured to receive a current from the rectifier circuitry using a path between the battery charger circuitry and the rectifier circuitry;
sensor circuitry coupled to the path between the rectifier circuitry and the battery charger circuitry; and
control circuitry configured to measure the output power at the path using the sensor circuitry to identify a peak in the output power while adjusting the current.

14. The wireless power receiving device defined in claim 13 wherein the control circuitry is configured to adjust the duty cycle by wirelessly communicating with the wireless power transmitting device.

15. The wireless power receiving device defined in claim 14 wherein the control circuitry is configured to identify the peak in the output power while adjusting the current while receiving the wireless power signals at the adjusted duty cycle.

16. The wireless power receiving device defined in claim 15 wherein the control circuitry is configured to:
wirelessly transmit a duty cycle change request to the wireless power transmitting device in response to identifying the peak in the output power while adjusting the current while receiving the wireless power signals at the adjusted duty cycle.

17. The wireless power receiving device defined in claim 13 wherein the control circuitry is configured to determine whether a desired power is being supplied to the battery charging circuitry at the peak and, in response to determining that the desired power is not being supplied, transmitting a duty cycle change request to the wireless power transmitting equipment that directs the wireless power transmitting equipment to increase the duty cycle.

18. The wireless power receiving device defined in claim 17 further comprising a battery, wherein the rectifier and the battery charger are configured to charge the battery while the rectifier receives the wireless power signals from the wireless power receiving coil at the increased duty cycle.

19. A wireless power receiving device configured to receive power from a wireless power transmitting device that has an inverter configured to supply a drive signal with an associated duty cycle and that has at least one wireless power transmitting coil configured to receive the drive signal and to transmit corresponding wireless power signals with the duty cycle to the wireless power receiving device, the wireless power receiving device comprising:
a wireless power receiving coil configured to receive the transmitted wireless power signals with the duty cycle;
rectifier circuitry coupled to the wireless power receiving coil that is configured to supply output power based on the wireless power signals received with the wireless power receiving coil;
an integrated circuit configured to receive the output power from the rectifier circuitry while drawing a current from the rectifier circuitry; and
control circuitry configured to adjust the duty cycle of the drive signal based at least partly on measurements from sensor circuitry that identify a peak in the output power across multiple values of the current.

20. The wireless power receiving device defined in claim 19 wherein the control circuitry is configured to wirelessly transmit duty cycle change requests to the wireless power transmitting device to adjust the duty cycle.

21. The wireless power receiving device defined in claim 20 further comprising:
a display; and
a battery configured to receive power from the integrated circuit.

22. The wireless power receiving device defined in claim 21 wherein the integrated circuit comprises a battery charger integrated circuit and wherein the control circuit is configured to identify the peak in the output power across multiple values of the current by adjusting the battery charger integrated circuit to draw the multiple values of the current.

\* \* \* \* \*